United States Patent [19]
Jonker

[11] 4,089,019
[45] May 9, 1978

[54] MULTI-IMAGE CASSETTE HOLDER
[76] Inventor: Roelof R. Jonker, 15912 Maybrook St., Westminister, Calif. 92683
[21] Appl. No.: 694,299
[22] Filed: Jun. 9, 1976
[51] Int. Cl.² .................. G03B 1/00; G03B 27/44
[52] U.S. Cl. ................................. 354/124; 355/54
[58] Field of Search ............... 354/110, 120, 123, 124, 354/125; 355/20, 54

[56] References Cited
U.S. PATENT DOCUMENTS

| 597,268 | 1/1898 | Dake et al. | 354/124 |
| 600,515 | 3/1898 | Collier | 354/124 |
| 1,726,313 | 8/1929 | Ray | 354/124 |
| 3,591,282 | 7/1971 | Renold | 355/54 |
| 3,696,720 | 10/1972 | Vinson | 355/20 X |
| 3,877,043 | 4/1975 | Marvel | 354/123 |

Primary Examiner—Donald A. Griffin
Attorney, Agent, or Firm—Boniard I. Brown

[57] ABSTRACT

An improved multi-image film cassette holder especially adapted to produce hard copy images from the oscilloscope display of radio-isotropic, ultrasonic, thermographic or computerized axial tomographic devices which utilize an oscilloscope to produce soft images. The film cassette holder includes guides at 90° to each other and suitable masks or curtains so that predetermined portions of the film within the cassette can be exposed one at a time by manually moving the cassette to predetermined positions with respect to an imaging system such as an oscilloscope camera. The film cassette holder can be adapted to fit a wide variety of such cameras while using a conventional film cassette.

9 Claims, 18 Drawing Figures

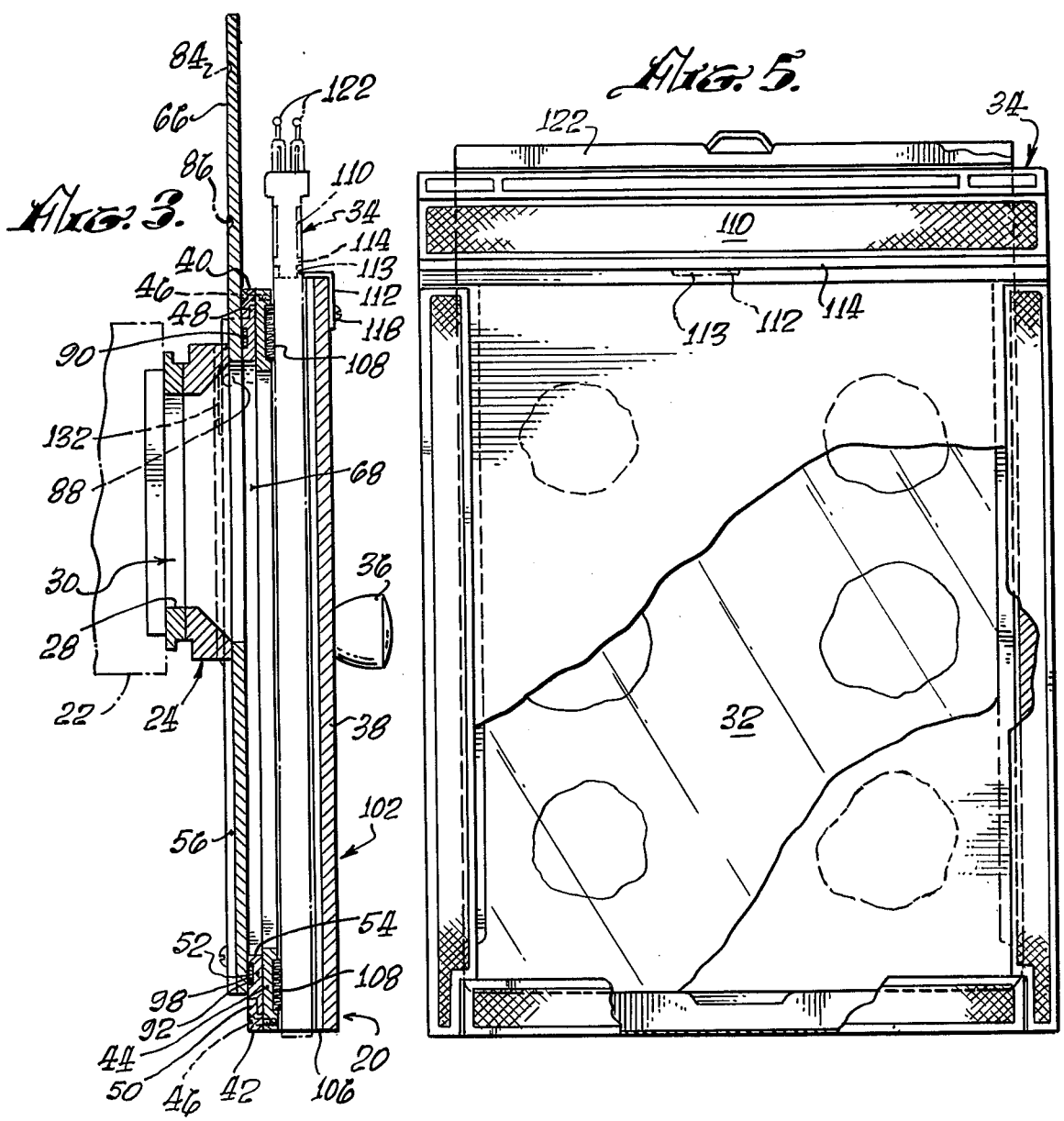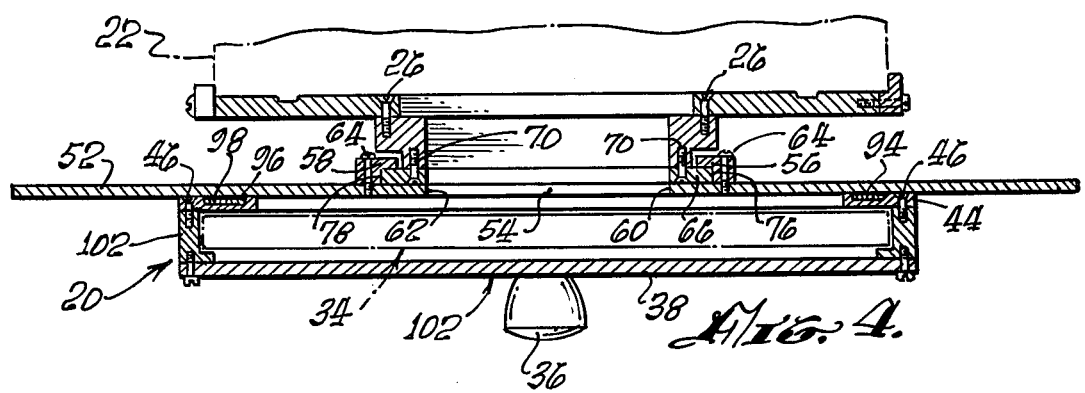

U.S. Patent May 9, 1978 Sheet 3 of 4 4,089,019
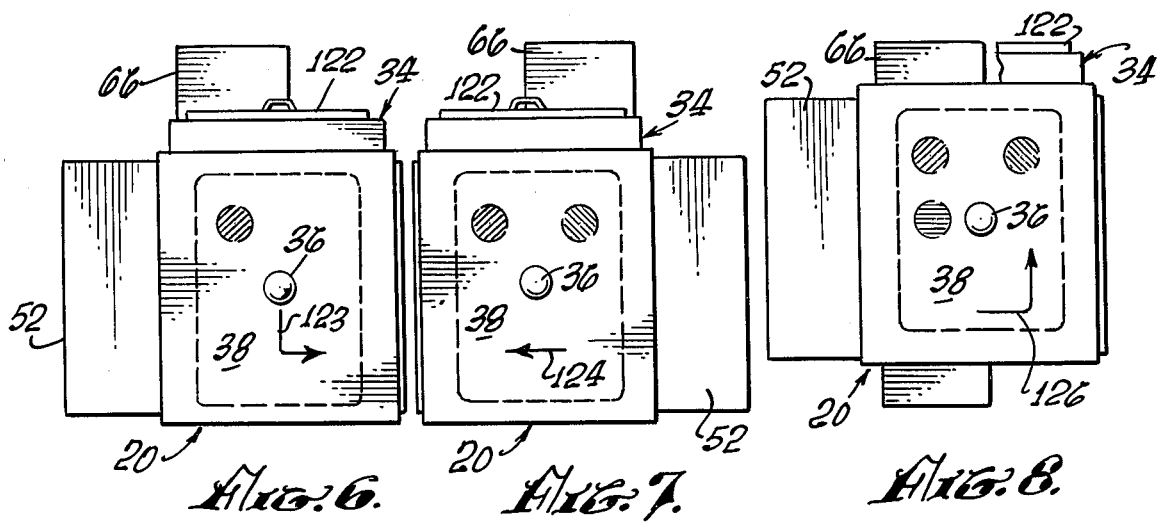
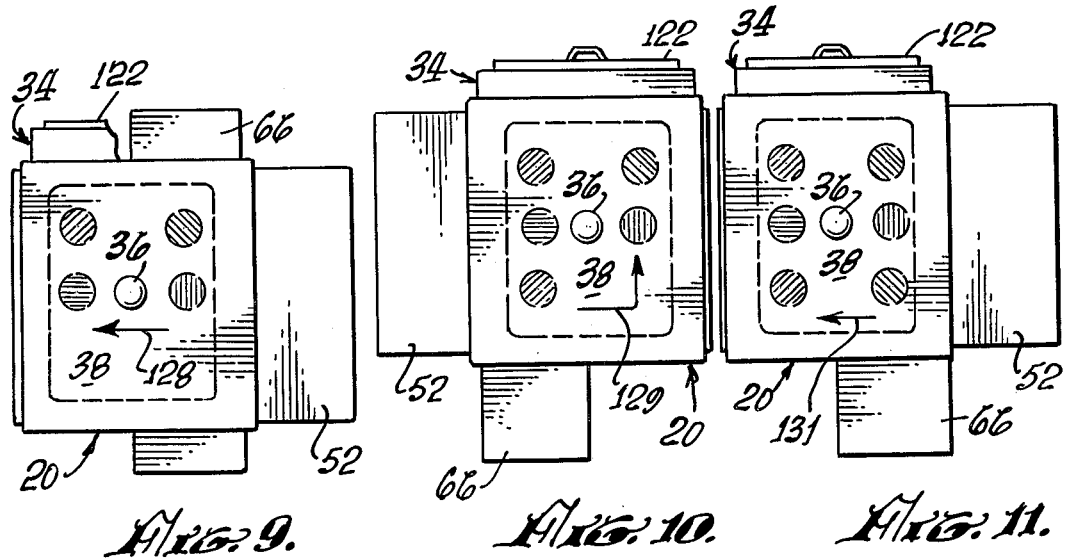
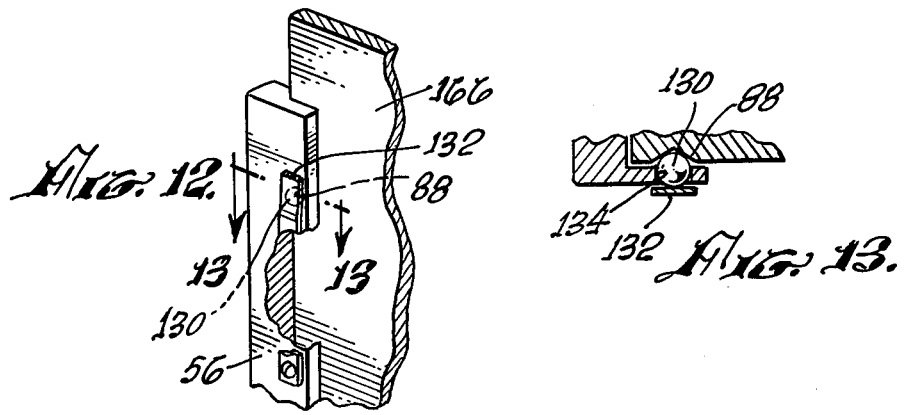

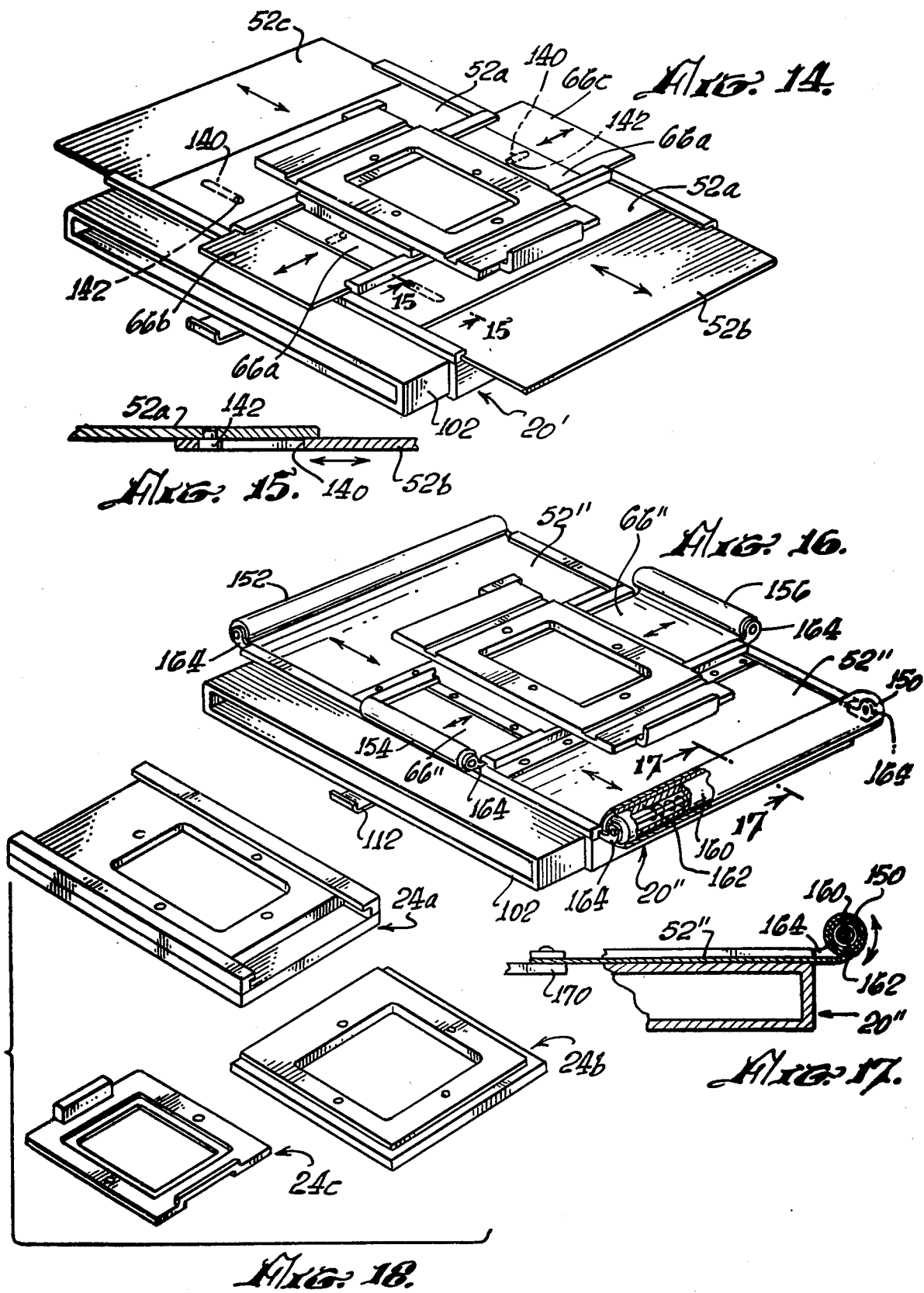

MULTI-IMAGE CASSETTE HOLDER

BACKGROUND OF THE INVENTION

This invention relates in general to an improved film cassette holder which includes means allowing selective portions of the film to be exposed at different times so that multiple images can be recorded on a single piece of film. The invention is primarily for use with imaging systems such as oscilloscope cameras which produce hard copies of the soft information produced on cathode ray tubes by image formation systems used primarily by physicians.

There are presently existing many imaging systems which are used to produce images on a cathode ray tube (CRT) where it is desired to produce a permanent or "hard" record of the image so produced. This is conventionally done through the use of an oscilloscope camera and the addition of suitable electronics to the oscilloscope so that a large portion of the cathode ray tube is blank while the image of interest properly sized is produced in a specific area thereof. Later images are produced in the previously blanked areas of the CRT so that multiple images are ultimately exposed on a single photographic record. As can be imagined, the electronics required to produce the image shifting, sizing and blanking are relatively complex, expensive and difficult to maintain even with the advent of modern micro-circuitry. Such complex devices must be installed by specialized service engineers and they require special calibration and involve problems of drifting from calibration. In addition CRTs have a resolution limitation inherent in their design. Therefore, no matter how optical enlargement of the CRT image is accomplished before recordation on the film, lessor resolution images as the result of sizing are the result when such is implemented. In some instances these disadvantages have been recognized and corrections attempted, usually by providing an extremely high resolution oscilloscope or other such means which needlessly increase the cost of an imaging system.

Another method commonly used to produce multiple hard images is to utilize a camera which produces one image per piece of film such as those oscilloscope cameras produced by the Polaroid Corporation. This is disadvantageous whether or not the self-developing film produced by the Polaroid Corporation is used since multiple pictures each having a separate image thereon are always more expensive than a single film having multiple images thereon of equal size to the images produced on the individual films. It should also be mentioned that in the case of self-developing films, the desired wide variety of film type is not available so that the imaging system is not as versatile as it otherwise might be.

SUMMARY OF THE INVENTION

The present manually positioned framed film cassette holder for producing multiple images on a single piece of film solves all of the problems mentioned hereinbefore. The main mechanism for solving these problems is accomplished by a suitable mechanical device by which it is possible to move a film cassette with respect to framing means so that only a predetermined portion of the film can be exposed through a camera system at any one time. In its preferred embodiment the cassette holder uses convention double-sided sheet film cassettes well-known in the photographic art. The cassette along with its holder is movable in X and Y directions along labyrinth flanges which also act as light shields. Stops are provided on the flanges to limit cassette movement to a predetermined range and optional detent means can also be provided to provide intermediate positions so that three or more images can be recorded on a single sheet of film. Curtains or sliding light blocking plates are also provided in connection with the flanges to block light entry into the camera which would otherwise get in through openings caused by movement of the cassette holder.

It is therefore possible to provide multi-image hard copies of CRT displays without interacting into the CRT control circuitry to blank portions of the CRT, to reduce image size and to position the image in various segments of the CRT as is done in the prior art with its attendant loss of resolution. This is done without giving up the versatility of being able to use many different kinds of sheet film. Yet multiple images are provided on the same piece of film for the convenience of the physician reading the film and for his secretary or nurse who only needs to file one conventionally sized film for later referral.

It is therefore a primary object of the present invention to provide means to adapt a conventional oscilloscope camera and oscilloscope for multi-image recording on a single piece of film.

Another object is to reduce the cost of multi-image hard copy recording systems for CRT displays.

Another object is to provide a multi-image film cassette holder which can be adpated for use on a wide variety of camera bodies.

Another object is to provide a multi-image cassette holder which can be used in relatively restricted space through the use of telescoping or overlapping light shield panels or flexible curtains.

Another object is to provide a multi-image film cassette holder adapted for use with conventional sheet film cassettes.

Another object is to provide such a film holder into which the cassette can be loaded in multiple directions to avoid interference with adjacent structure.

These and and other objects and advantages of the present invention will become apparent after considering the following detail specification which covers preferred embodiments thereof in conjunction with the accompanying drawings wherein:

BRIEF DESCRIPTION OF THE DRAWINGS

FIG. 3 is a slightly enlarged cross-sectional view taken in line of 3—3 of FIG. 2;

FIG. 4 is a slightly enlarged cross-sectional view taken in line of 4—4 of FIG. 1;

FIG. 5 is a partially cutaway view of a conventional film holding cassette utilized with the present invention;

FIGS. 6 through 11 are simplified views of the rear of the present invention generally illustrating the respective positional relationship of the components thereof in providing six respective exposures or images on a single film;

FIG. 12 is an enlarged fragmentary perspective view taken in line 12—12 of FIG. 2;

FIG. 13 is a fragmentary sectional view taken at line 13—13 in 12;

FIG. 14 is a perspective view of a modified form of the present invention utilizing telescoping panels to form the rear light shield thereof;

FIG. 15 is an enlarged partial cross-sectional view taken at line 15—15 in FIG. 14;

FIG. 16 is a perspective view of another modified form of the present invention utilizing flexible roll-up curtains to form the light shield thereof;

FIG. 17 is a slightly enlarged partial cross-sectional view taken at line 17—17 in FIG. 16; and FIG. 18 is a perspective view showing various types of adapters used with the devices of the present invention so that cameras of widely differing type can be accommodated.

DETAILED DESCRIPTION OF THE PREFERRED EMBODIMENTS

Figure 1:
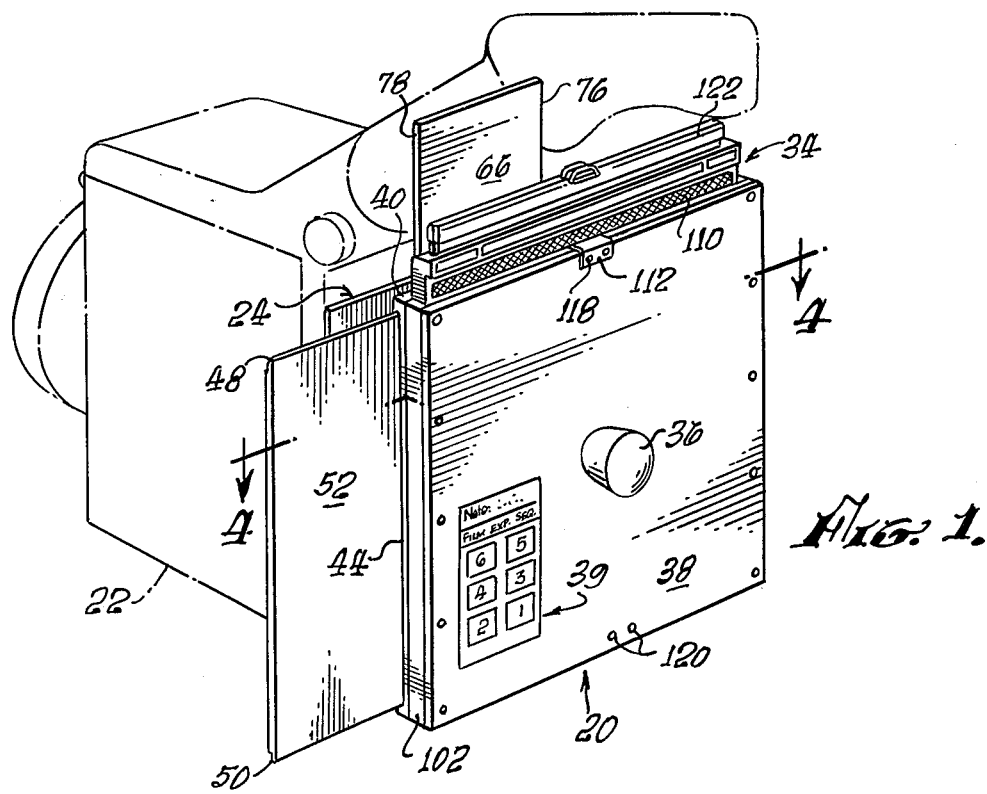
FIG. 1 is a perspective view showing a cassette holder constructed according to the present invention mounted on an oscilloscope camera which is shown in phantom outline.
Figure 2:
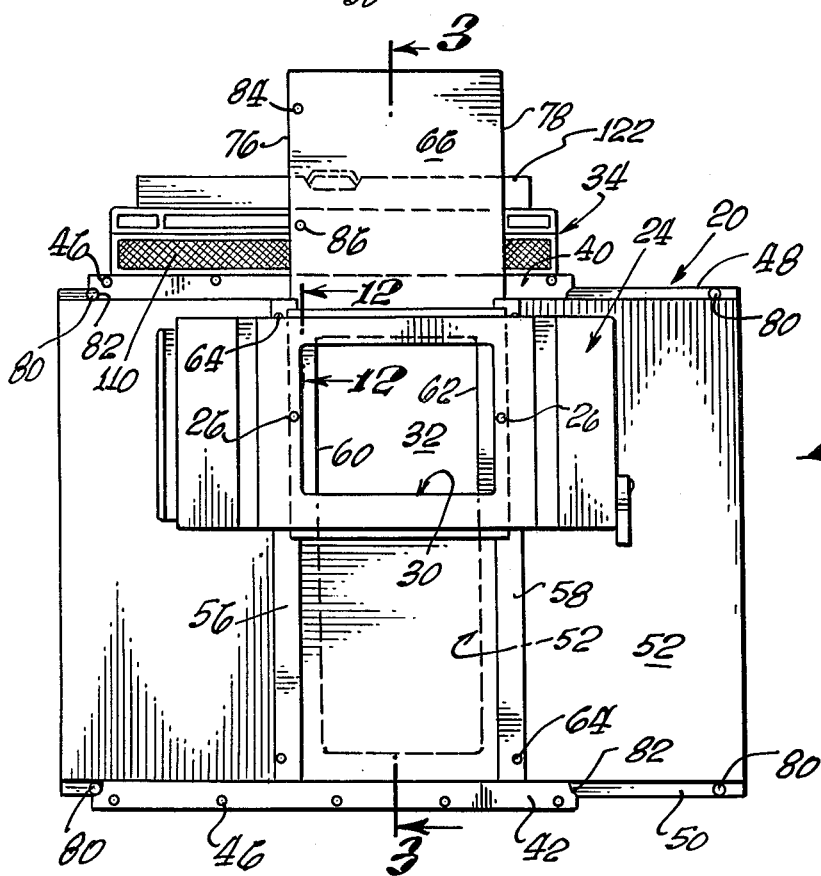
FIG. 2 is an elevational view of the device shown in FIG. 1 as viewed from the oscilloscope camera.

Referring to the drawings, more particularly by reference numbers, number 20 in FIG. 1 designates an improved multi-image film cassette holder constructed according to the present invention mounted on an oscilloscope camera by means of a suitable adapter 24 such as shown in FIG. 2. The method for connecting the adapter 24 to the camera 22 is chosen by the camera manufacturer whereas the adapter 24 is normally connected to the rest of the holder 20 by suitable means such as the screws 26. The adapter 24 usually includes a frame which assists in defining an opening 30 through which light can pass to expose a desired portion of photographic film 32 retained in the film cassette 34 which is in turn restrained by the holder 20. The film 32 in its cassette 34 is moveable with respect to the opening 30 both horizontally and vertically in the orientation shown in FIG. 2. This horizontal and vertical or X and Y movement is accomplished by means of manual force applied to a knob 36 centrally located on the back plate 38 of the film cassette holder 20.

The means allowing relative horizontal movement of the holder 20 can be seen in FIG. 3. They include a pair of inwardly facing flanges 40 and 42 which are fixed to the front frame 44 of the cassette holder 20 by suitable means such as the screws 46. The flanges 40 and 42 engage and are slidable along rails 48 and 50. The rails 48 and 50 form the outer borders of a light blocking plate 52 which is fixed in its horizontal position with respect to the opening 30. An opening 54 is provided in the plate 52 which is shown in dashed outline in FIG. 2. It should be noted that the opening is about as wide as the opening 30 but substantially longer. This accommodates the movement of the cassette. A second pair of inwardly facing flanges 56 and 58 are fixedly attached adjacent the innermost edges 60 and 62 of the opening 54 in the plate 52. This attachment is done by any suitable means such as the screws 64 shown in FIG. 4. The flange 56 and 58 like the plate 52 to which they are attached are fixed horizontally with respect to the opening 30. The flanges 56 and 58 restrain a second light blocking plate 66 therebetween. The second light blocking plate 66 also includes an opening 68 which is similar in size and shape to opening 30. The plate 66 is restrained in its horizontal and vertical position by attachment to the adapter 24 by means of screws 70 as shown in FIG. 4. It should therefore be obvious that the plate 66 is fixed with respect to the camera 22 and that its outermost vertical edges 76 and 78 provide the horizontal restraint and vertical freedom to the plate 52 through the flanges 56 and 58. The rails 48 and 50 and the flanges 40 and 42 allow horizontal freedom of movement so that the film cassette is fixed in neither horizontal nor vertical directions along a fixed plane which is parallel to the film 32 within the envelope of travel thereof as determined horizontally by stops 80 on the plate 52 which engage suitable abutment surfaces 82 on the ends of the flanges 40 and 42 and vertically by detents 84, 86 and 88 to be discussed hereinafter. Also additional light shields 90, 92, 94 and 96 may be incorporated into or adjacent the plates 52 and 66. As shown in FIGS. 3 and 4 they include a U-shaped cutout filled with felt 98 which forms a sliding light seal against the adjacent structure.

The cassette holder 20 includes a frame 102 having openings 104 and 106 into which the film cassette 34 can be inserted. As shown in FIG. 3, the cassette 34 is retained and shielded from light by felt elements 108 adjacent the opposite the open ends 104 and 106.

Referring to FIG. 5, to insert a cassette 34 into the frame 102, pressure is applied to the central upper area 110 thereof so that it is deformed and the frictional relationship caused by the felt element 108 is relieved allowing insertion. A small plate, clip or tab 112 serves to retain the cassette 34 by engaging a depression 113 next to a rib 114 thereon which functions as the cassette lock. The deformation of the area 110 also deforms the rib 114 and allows disengagement of the clip 112. The same rib 114 interferes with the frame 102 and prevents the cassette 34 from being moved completely through the frame 102. If, because of space limitations, it is desired to insert the cassette 34 through the opposite end opening 106, it is a simple task to remove the clip 112 by removing its attachment means, shown as screws 118 and reattach the clip 112 with the screws 118 going through holes 120 (FIG. 1) provided for that purpose.

Once the cassette 34 has been inserted into the frame 102 and the film shield 122 has been removed to expose the film 32 to the camera 22, all that remains is to position the cassette 34 properly and proceed to record the desired images. In FIG. 5, six images are shown in dashed outline indicating the normal positions of the images recorded.

FIG. 6 through 11 show diagrammatically how each of the images is taken and the relative appearance of the plates 52 and 66 during the image recording. FIG. 6 shows the normal position of the film cassette with respect to the plates 52 and 56 when the first image is being recorded. That position is acquired by moving the knob 36 in the direction shown by the arrow 123. As shown in FIG. 7 the knob 36 is then moved in the direction of arrow 124 so that a second image can be exposed which is located horizontally from the first. In FIG. 8 the knob 36 has been moved in accordance with arrow 126 so that a third image centrally located vertically but to the left horizontally is recorded on the film. Thereafter the knob 36 is moved in accordance with arrow 128 so that a fourth image horizontal from the third image is exposed. The knob 36 is then moved in accordance with arrows 129 and 131 so the images 5 and 6 as shown in FIGS. 10 and 11 can be recorded.

It is clear that stops like 80 could provide the positive positioning for images 1 and 2 and 5 and 6. However, to obtain the intermediate images 3 and 4, means such as the detents 84, 86 and 88 must be employed. The detents 84, 86 and 88 interact with a ball 130 which is spring loaded toward them by a leaf spring 133. The ball 130 and the spring 132 are conveniently placed in the flange 56 with the ball mounted in an opening 134 therethrough as shown in FIGS. 12 and 13.

FIGS. 14 and 15 show a slightly modified form of the multi-image cassette holder numbered 20' wherein telescoping light blocking plates 52a, 52b and 52c and 66a, 66b and 66c are provided in the place of light blocking plates 52 and 66. In essence the outer portions of the plates 52 and 66 have been disconnected a predetermined distance determined by a slot 140 such as the one shown in plate 52b and an engagement member 142 which extends from a plate such as 52a into the slot 140 in plate 52b. As shown in FIG. 15 the slot 140 and member 142 assure that light is never allowed to pass between the plates 52a, 52b and 52c. Similar means are provided for plates 66a, 66b and 66c so that the outermost edges of the plates 52b and 52c and 66b and 66c need not extend as far outwardly from the cassette 34 as they do in the embodiment 20. The modified embodiment 20' is used when there are interference problems with adjacent structure.

FIG. 16 shows another modified embodiment 20" wherein further space limitations can be accommodated. In the holder 20" the plates 52 and 66 are formed from thin flexible sheets made from materials like stainless steel numbered 52" and 66" respectively. Sheaths 150, 152, 154 and 156 are provided at the outer edges of the sheets 52" and 66". Takeup rollers such as roller 160 shown in sheath 150, which may or may not be biased by a spring such as the torsion spring 162 shown, are provided within the sheaths. The rollers are suitably mounted by pivots 164 for rotation so that as the frame 102 is moved with respect to the adapter 24, no light can leak in and ruin the film. Flanges such as flanges 40 and 42 and 56 and 58 form the edge seal for such sheets 52" and 66" as shown in greater detail in FIG. 17. The sheets 52" and 66" each may be made from a single piece or may be attached to a central frame 170 as shown in FIG. 17.

Additional versatility for the subject holder 20 can be obtained by providing various adapters such as adapters 24a, 24b and 24c shown in FIG. 18.

Thus, there has been shown and described, novel multi-image film cassette holders which fulfill all the objects and advantages sought therefor. Many changes, alterations, modifications and other uses and applications of the subject invention will become apparent to those skilled in the art after considering this specification and the accompanying drawings. All such changes, modifications, variations and other uses and applications which do not depart from the spirit and scope of the invention are deemed to be covered by the invention which is limited only by the claims which follow.

What is claimed is:

1. A holder for a radiation sensitive medium which enables selected portions of the medium to be exposed by an imaging system at different times, the improvement comprising:

adapter means for securing said holder to the imaging system;

first attachment means having a first portion connected to said adapter means and a second portion adapted to slide in a first direction along a plane parallel to said medium with respect to said first portion;

second attachment means connected to said first attachment means, said second attachment means having a first portion connected to said first attachment means second portion and adapted to slide in a second direction along a plane parallel to said medium with respect to said second attachment means first portion; and means retaining said medium connected to said second portion of said second attachment means, said first portion of said second attachment means including a first radiation shield defining an opening therethrough which is substantially larger than the size of a selected portion of the medium in said first direction, and said first portion of said first attachment means including a second radiation shield defining an opening substantially the same size as a selected portion of the medium, said second radiation shield being of a size in said first direction to prevent radiation from reaching the medium except as the selected portion when said medium is moved in said first direction, said first radiation shield being substantially larger than the size of a selected portion of the medium in said first direction so that when said medium is moved in said second direction, radiation can reach said medium only at said selected portion.

2. The holder defined in claim 1 wherein said first radiation shield includes at least two plates, one plate defining a slot in said second direction, said other plate including slot engaging means which enable telescoping motion between said plates.

3. The holder defined in claim 2 wherein said second radiation shield includes at least two plates, one plate defining a slot in said first direction, said other plate including slot engaging means which enable telescoping motion between said plates.

4. The holder defined in claim 1 wherein said first portion of said first attachment means includes a pair of rails and said second portion of said first attachment means includes a pair of flanges which engage said rails.

5. The holder defined in claim 4 wherein one of said flanges includes detent engagement means and wherein one of said rails includes a plurality of detents positioned for releasable engagement with said detent engagement means.

6. The holder defined in claim 5 wherein said detent engagement means includes a ball, a leaf spring attached to said flange urging said ball toward said detents and a socket formed in said flange in which said ball is positioned to restrict the freedom of movement of said ball.

7. The holder defined in claim 1 wherein said first radiation shield includes at least one flexible plate and a roller connected to an edge of said flexible plate and orientated at a right angle to said first direction, said flexible plate being formed so as to roll and unroll from said roll as said medium is moved.

8. The holder defined in claim 7 wherein said first radiation shield further includes a sheath about said roller which is positioned to cover a substantial portion of said rolled flexible plate, and bias means connected between said roller and said sheath which applies force to said roller in a direction to roll said flexible plate thereon.

9. The holder defined in claim 1 wherein indicia means (FILM EXP. SEQ.) are provided on said holder to indicate the positions of said portions of the medium to be exposed.

* * * * *